C. VAN DEN HANDEL.
LET-OFF MOTION FOR LOOMS.
APPLICATION FILED OCT. 28, 1914.

1,197,310.

Patented Sept. 5, 1916.

WITNESSES:

Cornelius Van Den Handel
INVENTOR.
BY John F. Kerr
ATTORNEY.

C. VAN DEN HANDEL.
LET-OFF MOTION FOR LOOMS.
APPLICATION FILED OCT. 28, 1914.

1,197,310.

Patented Sept. 5, 1916.
3 SHEETS—SHEET 2.

WITNESSES:

Cornelius Van Den Handel
INVENTOR.
BY John F. Kerr
ATTORNEY.

UNITED STATES PATENT OFFICE.

CORNELIUS VAN DEN HANDEL, OF PASSAIC, NEW JERSEY, ASSIGNOR OF ONE-THIRD TO JOHN F. KERR, OF PATERSON, NEW JERSEY.

LET-OFF MOTION FOR LOOMS.

1,197,310.  Specification of Letters Patent.  Patented Sept. 5, 1916.

Application filed October 28, 1914. Serial No. 869,993.

*To all whom it may concern:*

Be it known that I, CORNELIUS VAN DEN HANDEL, a citizen of the United States, residing at Passaic, in the county of Passaic and State of New Jersey, have invented certain new and useful Improvements in Let-Off Motions for Looms, of which the following is a specification, reference being had therein to the accompanying drawing.

My invention relates to improvements in looms for weaving silk or other fabrics, and the objects of the invention are, to secure a uniform tension on the warp threads; to provide means for adjusting the said tension and for releasing the same at will.

A further object of the invention is to do away with the use of weights suspended on ropes, one of the methods now in vogue for accomplishing the control of the motion of the warp-beam, and to obviate the objections to said method that the weights are bulky, unhandy, unseemly, take up considerable floor space, do not provide a uniform tension and cannot be adjusted with facility.

These objects are attained and objections avoided by the mechanism illustrated in the accompanying drawings which show an application of the principles of my invention.

Similar letters refer to similar parts throughout the several views of the drawings, in which:—

Figure 1:
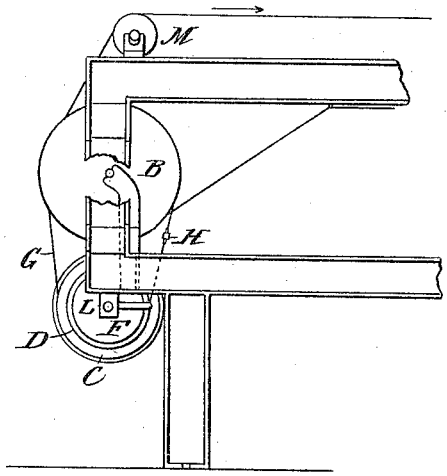
Figure 2:
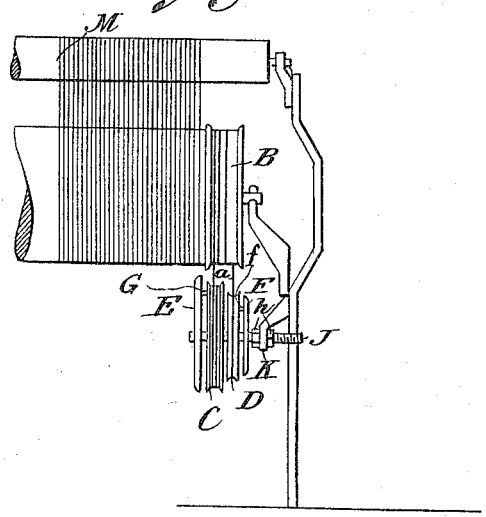
Figures 3, 4, 5:
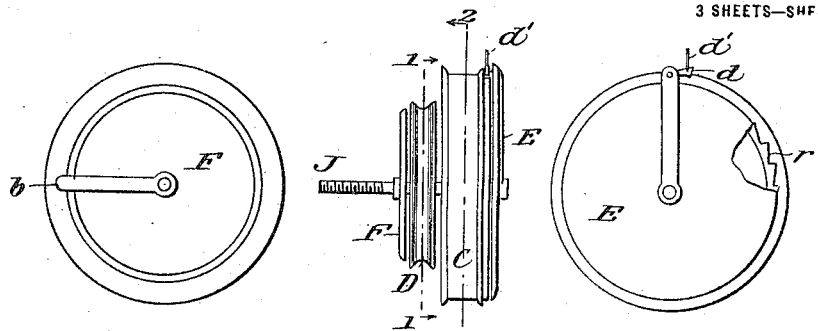
Figures 6, 7, 8:
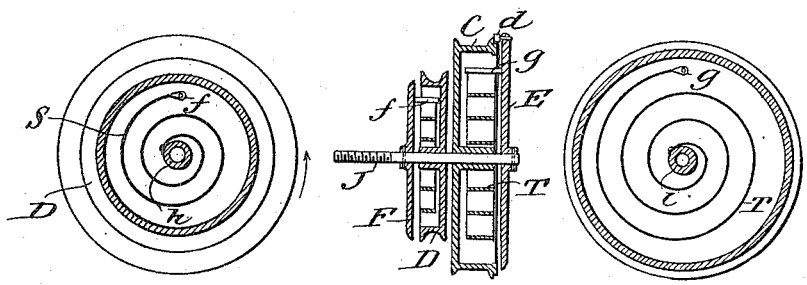
Figures 9, 10:
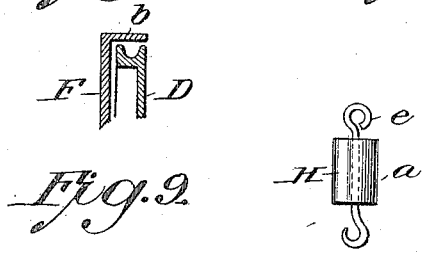
Figure 11:
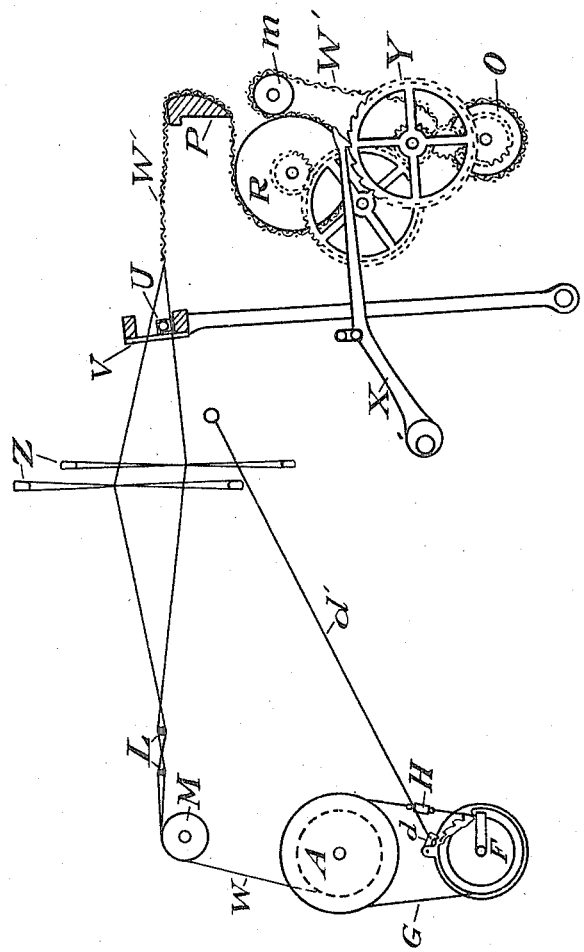

Figure 1 is a view of a portion of a loom showing the rear left hand side thereof embodying my invention; Fig. 2 a rear view of Fig. 1; Fig. 3 is a left hand view of Fig. 4; Fig. 4 is a front view of the device detached from the loom; Fig. 5 is a right hand view of Fig. 4; Fig. 6 is a sectional view taken along line 1—1 of Fig. 4; Fig. 7 is a section taken along the axis of Fig. 4; Fig. 8 is a section on the line 2—2 of Fig. 4; Fig. 9 is a detail fragment of a portion of the drum D and the disk F; Fig. 10 is a stop H which is attached to the cord G; and Fig. 11 is a view partly in section of portions of a loom showing the course of the warp from the warp-beam and the woven goods to the cloth-beam, and with my device applied.

The beam A holds the warp W which in unwinding during the operation of weaving passes over the guide roller M to the harness and reed in the usual manner. The device is supported by the bracket K through which the axle J passes and is secured by the nuts h—h. Disks E and F are secured to the axle J, and to them are fixed respectively one of the ends of the flat spiral springs T and S at g and f.

Drums C and D are loosely mounted upon the axle J and to them are secured the inner ends of the springs T and S at —i— and —h— respectively. Upon the rim of one face of the drum C is cut the ratchet teeth r, as shown in fragment in Fig. 5. The pawl —d— is adapted to engage the ratchet —r— automatically or is manipulated by means of the cord —d'— to release it when necessary at any time. Now the automatic action or the manipulation, as the case may be, of the pawl and ratchet will prevent a smash should anything happen to the take-up wheel or gears. The pawl —d— may be permitted to rest upon the highest portion of the inclined surface of one of the teeth of the ratchet —r—, so as to engage the succeeding tooth of the ratchet —r— in case the drum C should turn backward. In this instance the pawl —d— will automatically engage the ratchet —r— and prevent the drum C from turning farther backward; or the pawl —d— may be suspended above the ratchet —r— and may be lowered by the operator manipulating the cord —d'—, so that the pawl —d— will engage the ratchet when and where desired by the operator. The operator is not required to leave the front of the loom in order to do this. In the old style or with the weights and levers, now largely in vogue a smash would be unavoidable under the circumstances, the cloth would be pulled back to the reed and batten and the shuttle would inevitably be forced through and break every warp thread with which it would come in contact.

In the drawings A indicates the warp-beam and a flanged head B is secured to each end of the warp-beam A and both are fixed on the beam axle which is supported and turns in bearings on the upper end of the bracket K, as shown in Fig. 2, which is a rear view of one end of a loom. The opposite end of the loom is similarly rigged up with my improved device.

One end of the cord G is secured to the rim of the drum C around which the cord C is wound, as required, passing thence to the flanged head B on the end of the warp-beam A, around which it is wound several times, and thence passes to the drum D, to the rim of which the other end of the cord G is secured.

To limit the winding of the cord G onto the drum D when it is unwound from the drum C and from the flanged head B, a block H is employed as shown in Fig. 10, consisting of a cylinder of rubber or other similar material —a—, a rod passing through the cylinder and provided with a hook and eye —e— through which the cord G may be secured as shown in Fig. 1, at the point desired between the flanged head B and the drum D. The fixed disk F is provided with a member —b— projecting at right angles over the gutter in the spring-drum D which engages the stop-block H for the above mentioned purpose.

The cord —d'— which is attached to the pawl —d— may be run to and hung from any convenient support at the front of the loom which is easily accessible to the weaver's hand, whether the pawl —d— is suspended above the ratchet —r— or is resting on one of the teeth of the ratchet —r—.

When the device is attached to each end of the loom beneath the ends of the warp-beam A, the desired tension is obtained by giving the required number of turns to each of the drums, D and C, so as to bring the springs S and T under tension, the tension in T being maintained greater than in S. The cord G is then attached as hereinbefore mentioned and as shown in Figs. 1 and 2, and by the action of the said springs is immediately drawn taut.

As the warp W unwinds, the brake action of the cord G on the flanged head B insures a uniform tension in the warp. The block H is inserted to prevent the cord G winding up too far on the drum D when the tension in the drum C is released for adjustment or for any other desired purpose.

Should the weaver desire to release the tension of the warp W she does so by turning the pick-wheel backward and then the pawl —d— either automatically engages the ratchet teeth —r— or it is lowered by the weaver as hereinbefore described, so that it will engage the ratchet —r— where and when desired, which locks the drum C and prevents any winding up thereon of the cord G, and also prevents the warp-beam A from turning and taking up the slack warp, which is taken up when the weaver pulls the cord —d'— raising the pawl —d— and turns the pick-wheel forward again as required.

The tension spring T in the drum C is adapted to cause the drum C to turn in one direction and the tension spring S in the drum D to turn the drum D in the opposite direction, so that when the cord G is winding on the drum C, it is unwinding from the drum D and vice versa.

The principle of my invention is very simple, but it is efficient and accomplishes a very important function in the process of weaving. Hitherto, in practice, it has happened that so many weights have been necessary to serve as a brake to the motion of the warp-beam, owing to the great strain of a large body of warp threads tending to turn the warp-beam, that it was impossible for a female to attend to such a loom. With my device attached to the ends of a loom, a young girl can attend to the loom, a device embodying my invention making it unnecessary to lift great quantities of weights, as either the automatic action of the pawl —d— or the lowering of the same by the weaver to permit it to engage the ratchet —r— will lock the drum D and the tension of the warp threads may then be regulated from the front of the loom when desired in the usual manner by manipulating the pick wheel.

Many modifications may be made in the arrangement and construction of a device embodying the principle of my invention, and I do not therefore wish to confine myself to the specific construction shown for the purpose of illustrating that principle. In practice the warp-beam A is preferably one-third larger in circumference than the drum C, and the drum D is smaller than the drum C.

With this description of my invention, what I claim as new and desire to secure by Letters-Patent, is:—

1. In a loom, the combination with the warp-beam, of suitably connected opposed rotary yielding means tending to rotate said beam in opposite directions, the means acting against the pull of the warp being stronger than that acting with said pull.

2. In a loom, the combination with the warp-beam, of suitably connected opposed rotary yielding means tending to rotate said beam in opposite directions, the means acting against the pull of the warp being stronger than that acting with said pull, and means to limit the action of said means.

3. In a loom, the combination with the warp-beam, of yielding means tending to rotate said beam in the same direction as the pull of the warp, opposed yielding means of greater strength tending to rotate said beam against the pull of the warp, means under the control of the operator to prevent said stronger means from acting when the warp is slackened and means to limit the action of said weaker means.

4. In a loom, the combination with the warp-beam, of a friction-surface thereon, a cord or band passing around said surface, a pair of drums to which the ends of said cord or band are secured, torsion springs tending to turn said drums in opposite directions, that one of said springs, which tends to rotate the warp-beam backwardly, being stronger than the other spring, and means under the control of the operator, to prevent said weaker spring from acting to pull upon the warp when the feed of the latter is stopped for any reason.

5. In a loom, the combination with the warp-beam, of a friction surface thereon, a brake band passing around said surface, a stationary shaft mounted parallel to and below said beam, two drums loosely mounted on said shaft, each end of said band passing around one of said drums and being secured thereto, and a torsion spring connecting each drum to said shaft.

6. In a loom, the combination with the warp-beam, of a friction surface thereon, a brake band passing around said surface, a stationary shaft mounted parallel to and below said beam, a larger and a smaller drum loosely mounted on said shaft, a torsion spring connecting said larger drum to said shaft, and a torsion spring of less strength connecting said smaller drum to said shaft.

7. In a loom, the combination with the warp-beam, of a friction surface thereon, a brake band passing around said surface, a stationary shaft mounted parallel to and below said beam, a larger and a smaller drum loosely mounted on said shaft, a torsion spring connecting said larger drum to said shaft, and a torsion spring of less strength connecting said smaller drum to said shaft, and means, releasable at will, to hold said larger drum from being turned backwardly by its spring when the warp is slackened.

8. In a loom, the combination with the warp-beam having a brake surface at its ends, a brake band passing around said surface, winding drums to which the ends of said band are respectively connected, torsion springs tending to turn said drums in opposite directions to exert tension upon said band, the spring which acts against the rotation of the warp-beam being stronger than the other, and means to limit the rotation of said drums.

9. In a loom, the combination with the warp-beam having a brake surface, a friction band wound on the same, and adjustable rotary spring means attached to the ends of said band to cause the same to bear with more or less friction on said surface, the spring means which acts on that end of said band, which is put under tension by the rotation of said surface, being of greater strength than the spring means acting on the other end of said band.

10. In a loom, the combination with the warp-beam, and a strand of suitable material coiled about the end thereof, of oppositely acting spring actuated drums to each of which one end of said coil is secured, for the purposes specified.

In testimony whereof I affix my signature in presence of two witnesses.

CORNELIUS VAN DEN HANDEL.

Witnesses:
BESSIE BERLINER,
JOHN F. KERR.